(12) United States Patent
Hirano et al.

(10) Patent No.: US 10,131,018 B2
(45) Date of Patent: Nov. 20, 2018

(54) GRAIN-ORIENTED MAGNETIC STEEL SHEET AND METHOD OF PRODUCING THE SAME

(71) Applicant: Nippon Steel & Sumitomo Metal Corporation, Tokyo (JP)

(72) Inventors: Koji Hirano, Tokyo (JP); Satoshi Arai, Tokyo (JP); Hideyuki Hamamura, Tokyo (JP); Hirofumi Imai, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 390 days.

(21) Appl. No.: 14/390,110

(22) PCT Filed: Apr. 24, 2013

(86) PCT No.: PCT/JP2013/062029
§ 371 (c)(1),
(2) Date: Oct. 2, 2014

(87) PCT Pub. No.: WO2013/161863
PCT Pub. Date: Oct. 31, 2013

(65) Prior Publication Data
US 2015/0059932 A1   Mar. 5, 2015

(30) Foreign Application Priority Data

Apr. 27, 2012 (JP) ................................ 2012-103212

(51) Int. Cl.
B23K 26/082     (2014.01)
B23K 26/364     (2014.01)
(Continued)

(52) U.S. Cl.
CPC ........ *B23K 26/0821* (2015.10); *B23K 26/082* (2015.10); *B23K 26/364* (2015.10);
(Continued)

(58) Field of Classification Search
CPC ................ B23K 26/364; B23K 26/082; B23K 26/0821; H01F 1/16
(Continued)

(56) References Cited

U.S. PATENT DOCUMENTS

| 4,750,949 A | 6/1988 | Kobayashi et al. |
| 4,770,720 A | 9/1988 | Kobayashi et al. |

(Continued)

FOREIGN PATENT DOCUMENTS

| EP | 0469710 A1 | 2/1992 |
| EP | 0870843 A1 | 10/1998 |

(Continued)

OTHER PUBLICATIONS

International Search Report dated Aug. 6, 2013 issued in corresponding PCT Application No. PCT/JP2013/062029 [with English Translation].

(Continued)

*Primary Examiner* — Brian D Walck
(74) *Attorney, Agent, or Firm* — Birch, Stewart, Kolasch & Birch, LLP

(57) ABSTRACT

A grain-oriented magnetic steel sheet includes grooves each of which extends in a direction intersecting a transportation direction, the grooves being formed at predetermined pitches PL in the transportation direction by laser beam irradiation, in which a relationship between a standard deviation value D and the pitch PL satisfies the following expression (1), the standard deviation value D being a standard deviation of distances between a linear approximation line, which is obtained from a center line of each of the grooves in a groove width direction by a least-squares method, and respective positions on the center line, and an average angle formed between tangent lines of the respective positions on the center line and a direction perpendicular to the transportation direction is more than 0° to 30°.

[Expression 1]

$$0.02 \leq (D/PL) \qquad (1)$$

5 Claims, 9 Drawing Sheets

(51) Int. Cl.
  *C21D 8/12* (2006.01)
  *C22C 38/00* (2006.01)
  *C22C 38/06* (2006.01)
  *H01F 1/16* (2006.01)
  *C22C 38/02* (2006.01)
  *C22C 38/04* (2006.01)
  *C21D 10/00* (2006.01)

(52) U.S. Cl.
  CPC ............ *C21D 8/12* (2013.01); *C21D 8/1277* (2013.01); *C21D 8/1294* (2013.01); *C21D 10/005* (2013.01); *C22C 38/00* (2013.01); *C22C 38/001* (2013.01); *C22C 38/02* (2013.01); *C22C 38/04* (2013.01); *C22C 38/06* (2013.01); *H01F 1/16* (2013.01)

(58) Field of Classification Search
  USPC ........................................................ 148/306
  See application file for complete search history.

(56) References Cited

U.S. PATENT DOCUMENTS

| | | |
|---|---|---|
| 5,296,051 A | 3/1994 | Inokuti et al. |
| 5,350,464 A | 9/1994 | Benford |
| 2013/0017408 A1 | 1/2013 | Sakai et al. |

FOREIGN PATENT DOCUMENTS

| | | |
|---|---|---|
| EP | 0992591 A2 | 4/2000 |
| EP | 2796583 A1 | 10/2014 |
| JP | 58-026406 | 6/1983 |
| JP | 62-053579 | 11/1987 |
| JP | 62-054873 | 11/1987 |
| JP | 06-057335 | 3/1994 |
| JP | 06-136449 | 5/1994 |
| JP | 06-299244 | 10/1994 |
| JP | 07-048626 | 2/1995 |
| JP | 07-048627 | 2/1995 |
| JP | 2000-109961 | 4/2000 |
| JP | 2012-036450 | 2/2012 |
| JP | 2012-057232 | 3/2012 |
| KR | 1996-0005227 | 4/1996 |
| KR | 10-2000-0028848 | 5/2000 |
| SU | 1744128 A1 | 6/1992 |
| WO | WO 2011/125672 | 10/2011 |
| WO | 2012/033197 A1 | 3/2012 |

OTHER PUBLICATIONS

Search Report dated Nov. 30, 2015 issued in corresponding European Application No. 13782201.1.
Notice of Allowance dated Apr. 12, 2016, issued in corresponding Japanese Application No. 2014-512641 (with English-language translation).
Office Action dated Dec. 18, 2015 issued in corresponding Russian Application No. 2014140878.
Office Action issued on Oct. 19, 2015 in a corresponding Korean Patent Application No. 10-2014-7028018.

ROLLING DIRECTION

GRAIN-ORIENTED MAGNETIC STEEL SHEET AND METHOD OF PRODUCING THE SAME

TECHNICAL FIELD OF THE INVENTION

This application is a national stage application of International Application No. PCT/JP2013/062029, filed Apr. 24, 2013, which claims priority to Japanese Patent Application No. 2012-103212, filed on Apr. 27, 2012, each of which is incorporated by reference in its entirety.

The present invention relates to a grain-oriented magnetic steel sheet which is used in an iron core material or the like of a winding transformer, and a method of producing the same. In particular, the present invention relates to a grain-oriented magnetic steel sheet in which iron loss is reduced by forming grooves in a surface thereof by laser beam machining, and a method of producing the same.

RELATED ART

A grain-oriented magnetic steel sheet is an magnetic steel sheet which contains Si and in which a magnetization easy axis ((110)<001>orientation) of a crystal grain thereof is approximately aligned with a rolling direction in a production process thereof. This grain-oriented magnetic steel sheet has a structure in which multiple magnetic domains in which magnetization is directed in the rolling direction are arranged with a magnetic domain wall interposed therebetween, and most of these magnetic domain walls are 180° magnetic domain walls. The magnetic domain of this grain-oriented magnetic steel sheet is called a 180° magnetic domain and the grain-oriented magnetic steel sheet is easily magnetized in the rolling direction. For this reason, in a certain relatively small magnetizing force, magnetic flux density is high and iron loss (energy loss) is low. Therefore, the grain-oriented magnetic steel sheet is excellent as an iron core material of a transformer. As a parameter of the iron loss, generally, W17/50 (W/kg) is used. W17/50 is a value of iron loss which is generated in a grain-oriented magnetic steel sheet when alternating-current excitation is performed such that the maximum magnetic flux density becomes 1.7 T at a frequency of 50 Hz. If W17/50 is reduced, a more efficient transformer can be manufactured.

A normal method of producing a grain-oriented magnetic steel sheet will be schematically described below. The thickness of a hot-rolled silicon steel sheet (a hot-rolled sheet) containing a predetermined amount of Si is adjusted to a desired thickness by annealing and cold rolling. Next, the silicon steel sheet is annealed in a continuous annealing furnace to perform a primary recrystallization (grain size: 20 µm to 30 µm) together with decarburization and strain relief. Subsequently, an annealing separator containing MgO as a major component is applied to a surface of the silicon steel sheet (hereinafter also referred to simply as "steel sheet"), the steel sheet is coiled into a coil shape (an outer shape is a cylindrical shape), batch annealing is performed at a high temperature of about 1200° C. for about 20 hours to thereby form a secondary recrystallization texture in the steel sheet, and a glass film is formed on a surface of the steel sheet.

At that time, since the steel sheet contains, for example, an inhibitor such as MnS or AlN, a so-called Goss grain in which a rolling direction and a magnetization easy magnetic domain conform to each other is preferentially subjected to crystal growth. As a result, a grain-oriented magnetic steel sheet having a high crystal orientation (orientation) after final annealing is obtained. After final annealing, the coil is uncoiled, and the steel sheet is continuously transported into a separate annealing furnace to perform flattening annealing, thereby eliminating unnecessary strain in the steel sheet. In addition, a coating film is formed on a surface of the steel sheet to impart tension and electric insulation thereto. As a result, a grain-oriented magnetic steel sheet is produced.

In the grain-oriented magnetic steel sheet produced through such a process, even if an additional treatment is not carried out, the iron loss is low. However, if strain substantially perpendicular to a rolling direction (hereinafter also referred to as a transportation direction) and having a constant period (a regular interval) is imparted, the iron loss is further reduced. In this case, a 90° magnetic domain in which the rolling direction and magnetization are orthogonal to each other is formed by local strain and a magnetic domain wall interval of a substantially rectangular 180° magnetic domain is narrowed (the width of a 180° magnetic domain is reduced) with magnetostatic energy of the 90° magnetic domain as a source. Since the iron loss (W17/50) has a positive correlation with the interval between the 180° magnetic domain walls, the iron loss is reduced based on this principle.

For example, as disclosed in Patent Document 1, a method in which strain is imparted to a steel sheet by laser irradiation has already been put to practical use. Similarly, if a groove having a depth in a range of 10 µm to 30 µm is formed substantially perpendicular to a rolling direction of a grain-oriented magnetic steel sheet and at a constant period, the iron loss is reduced. This is because a magnetic pole is generated in the periphery of the groove due to a change in permeability in a void of the groove, the interval between the 180° magnetic domain walls is narrowed with the magnetic pole as a source, and thus the iron loss is improved. Examples of a method of forming a groove include a method disclosed in Patent Document 2 in which a groove is formed in a cold rolled sheet using electrolytic etching, a method disclosed in Patent Document 3 in which a tooth-shaped die is mechanically pressed on a cold rolled sheet, and a method disclosed in Patent Document 4 in which a steel sheet (a laser-irradiated portion) is melted and evaporated by laser irradiation.

Incidentally, power transformers are roughly divided into laminated transformers and winding transformers. Laminated transformers are manufactured by laminating and fixing multiple magnetic steel sheets. On the other hand, in a manufacturing process of winding transformers, since a grain-oriented magnetic steel sheet is coiled by performing lamination while coiling it, an annealing process to release deformation strain (for example, strain due to bending) thereof is included. Therefore, a grain-oriented magnetic steel sheet produced by the method disclosed in Patent Document 1 in which strain is imparted to a steel sheet to improve the iron loss can be used in the laminated transformer while maintaining an iron loss reduction effect. However, the grain-oriented magnetic steel sheet cannot be used in the winding transformer while maintaining an iron loss reduction effect. That is, in the winding transformer, since strain disappears due to strain relief annealing, the iron loss reduction effect also disappears. On the other hand, in a grain-oriented magnetic steel sheet produced by the method of forming a groove to improve the iron loss, even if the strain relief annealing is performed, the effect of improving the iron loss is not reduced. Therefore, this grain-oriented magnetic steel sheet has an advantage effect in that it can be used in both the laminated transformer and the winding transformer.

Here, a method of forming a groove in the related art will be described. In the method disclosed in Patent Document 2 in which a groove is formed in a cold rolled sheet using electrolytic etching, a glass film is formed on a surface of the steel sheet subjected to, for example, secondary recrystallization, the glass film on the surface is linearly removed by laser irradiation or a mechanical method, and a groove is formed in a portion where a matrix is exposed by etching. In this method, the process is complicated, the manufacturing cost increases, and there is a limit to treatment speed.

In the method disclosed in Patent Document 3 in which a tooth-shaped die is mechanically pressed on a cold rolled sheet, since a magnetic steel sheet is a very hard steel sheet containing about 3% of Si the tooth-shaped die is easily worn away and damaged. If the tooth-shaped die is worn away, since the depth of the groove varies, the iron loss reduction effect becomes non-uniform. In order to avoid this problem, it is necessary to strictly manage the tooth-shaped die during an operation.

The method using laser irradiation (referred to as a laser method) has an advantageous effect in that high-speed groove machining can be performed by a focused laser beam having high power density. Further, since the laser method is non-contact machining, stable and uniform groove machining can be performed by control of laser power or the like. Regarding the laser method, various attempts to efficiently form a groove having a depth of 10 μm or more on a surface of a steel sheet have been made in the related art. For example, Patent Document 4 discloses a method of forming a groove by realizing high power density (energy density at a focal point) of $2 \times 10^5$ W/mm$^2$ or more using a pulsed $CO_2$ laser (wavelength: 9 μm to 11 μm) having high peak power. Here, in the method using the pulsed $CO_2$ laser, a laser stop time is present between successive pulses. Therefore, when a surface of a steel sheet is scanned with a laser beam at high speed, holes (a row of points) which are formed by the pulses are connected to each other on a scanning line of a laser beam, and thus a groove is formed thereon.

On the other hand, Patent Document 5 discloses a method in which a projection formed by a molten object generated at a peripheral portion of a groove is significantly decreased by forming a groove which continuously extends using a continuous-wave laser beam.

PRIOR ART DOCUMENT

Patent Document

[Patent Document 1] Japanese Examined Patent Application, Second Publication No. S58-26406
[Patent Document 2] Japanese Examined Patent Application, Second Publication No. S62-54873
[Patent Document 3] Japanese Examined Patent Application, Second Publication No. S62-53579
[Patent Document 4] Japanese Unexamined Patent Application, First Publication No. H06-57335
[Patent Document 5] PCT International Publication No. WO 2011/125672

DISCLOSURE OF THE INVENTION

Problems to be Solved by the Invention

Incidentally, the laser method has the following problem. With the method disclosed in Patent Document 5, a projection occurring on a surface of a steel sheet is minimized. However, in a peripheral portion around the bottom of a groove, a melt-resolidified portion produced by laser irradiation is still present, which causes deformation of the steel sheet, more specifically, warpage in a rolling direction (so-called L-warpage). When a transformer is manufactured by combining multiple steel sheets, a space factor decreases due to an effect of the above deformation, and there is a problem of a decrease in the performance of the transformer. In addition, similarly, due to an effect of the above deformation, local stress concentration occurs during lamination and compression. As a result, the iron loss of the transformer may increase.

The present invention has been made in consideration of the above-described circumstances, and an object thereof is to suppress deformation such as warpage in a rolling direction derived from grooves in a grain-oriented magnetic steel sheet on which the grooves are formed by laser beam machining to reduce iron loss.

Measures for Solving the Problem

The present invention adopts the following measures to solve the above-described problems and to achieve the above-described object.

(1) According to an aspect of the present invention, there is provided a grain-oriented magnetic steel sheet including grooves each of which extends in a direction intersecting a transportation direction, the grooves being formed at predetermined pitches PL in the transportation direction by laser beam irradiation, in which a relationship between a standard deviation value D and the pitch PL satisfies the following expression (1), the standard deviation value D being a standard deviation of distances between a linear approximation line, which is obtained from a center line of each of the grooves in a groove width direction by a least-squares method, and respective positions on the center line, and an average angle formed between tangent lines of the respective positions on the center line and a direction perpendicular to the transportation direction is more than 0° to 30°.

[Expression 1]

$$0.02 \leq (D/PL) \tag{1}$$

(2) In the grain-oriented magnetic steel sheet according to (1), each of the grooves may be formed to be curved on the grain-oriented magnetic steel sheet.

(3) In the grain-oriented magnetic steel sheet according to (1) or (2), the grooves may be formed on a front surface and a back surface of the grain-oriented magnetic steel sheet.

(4) In the grain-oriented magnetic steel sheet according to (3), positions of the grooves formed on the front surface may be the same as positions of the grooves formed on the back surface.

(5) According to another aspect of the present invention, there is provided a method of producing a grain-oriented magnetic steel sheet, the method including irradiating a grain-oriented magnetic steel sheet with a laser beam to form grooves, each of which extends in a direction intersecting a transportation direction, at predetermined pitches PL in the transportation direction, in which a relationship between a standard deviation value D and the pitch PL satisfies the following expression (1), the standard deviation value D being a standard deviation of distances between a linear approximation line, which is obtained from a center line of each of the grooves in a groove width direction by a least-squares method, and respective positions on the center line, and an average angle formed between tangent lines of the respective positions on the center line and a direction perpendicular to the transportation direction is more than 0° to 30°.

[Expression 2]

$$0.02 \leq (D/PL) \quad (1)$$

(6) In the method of producing a grain-oriented magnetic steel sheet according to (5), a wavelength of the laser beam may be in a range of 0.4 μm to 2.1 μm.

Effects of the Invention

According to the aspects, it is possible to suppress deformation such as warpage in a rolling direction derived from grooves in a grain-oriented magnetic steel sheet on which the grooves are formed by laser beam machining to reduce iron loss.

EMBODIMENTS OF THE INVENTION

Hereinafter, the details of a preferred embodiment of the present invention will be described with reference to the accompanying drawings. In this specification and the drawings, components having practically the same function are represented by the same reference numerals, and the description thereof will not be repeated.

A grain-oriented magnetic steel sheet according to an embodiment of the present invention includes a steel sheet, a glass film that is formed on a surface of the steel sheet, and an insulating film that is formed on the glass film. Typically, the steel sheet is made from an iron alloy containing Si which is used as a material of the grain-oriented magnetic steel sheet. The composition of the steel sheet according to the embodiment contains, for example, Si: 2.5 mass % to 4.0 mass %, C: 0.02 mass % to 0.10 mass %, Mn: 0.05 mass % to 0.20 mass %, acid-soluble Al: 0.020 mass % to 0.040 mass %, N: 0.002 mass % to 0.012 mass %, S: 0.001 mass % to 0.010 mass %, P: 0.01 mass % to 0.04 mass %, and a balance including Fe and unavoidable impurities. In addition, the thickness of the steel sheet is, typically, 0.15 mm to 0.35 mm. The width of the steel sheet is, for example, about 1 m.

In addition to the above-described elements, the grain-oriented magnetic steel sheet according to the embodiment may further contain Cu, Cr, Sn, Sb, Ti, B, Ca, REM (rare earth element such as Y, Ce, or La), or the like as an unavoidable impurity or as an element for improving magnetic properties within a range not impairing mechanical properties and magnetic properties of the grain-oriented magnetic steel sheet.

Figure 1:
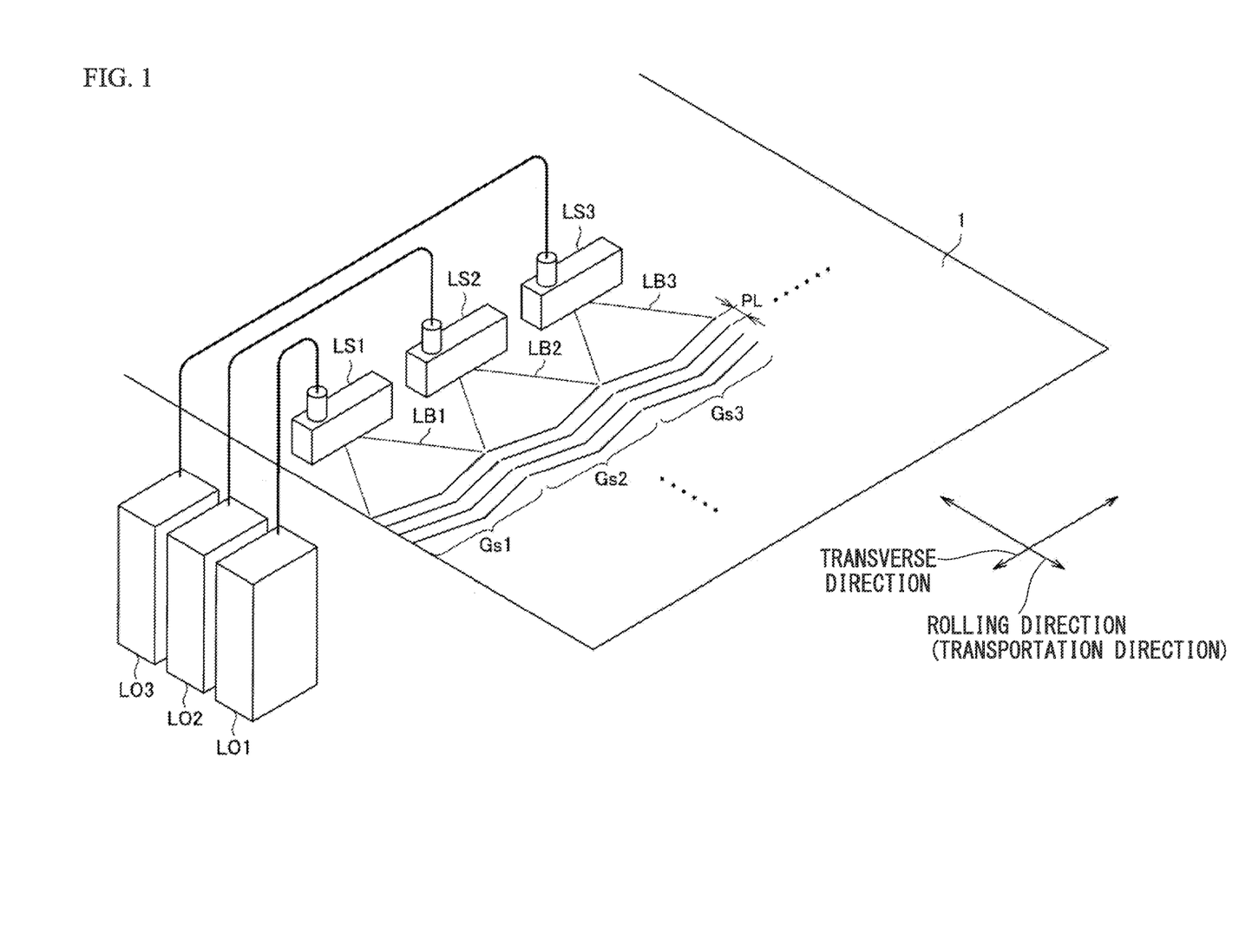
FIG. 1 is a schematic diagram illustrating a state where grooves are formed by laser beam machining on a surface of a grain-oriented magnetic steel sheet according to an embodiment of the present invention.

In the grain-oriented magnetic steel sheet according to the embodiment, as illustrated in FIG. 1, curved grooves G (refer to FIG. 2), each of which extends in a direction (transverse direction) substantially perpendicular to a rolling direction, are formed on a surface of the steel sheet 1 periodically in the rolling direction. Regarding the cross-sectional shape of the groove G, for example, the groove depth is 5 to 50 μm, and the groove width is 10 μm to 300 μm as known. The pitch of the grooves G is preferably 2 mm to 10 mm. In the embodiment, each of the grooves G is formed to be curved, not linear, on the surface of the steel sheet 1. Hereinafter, a preferred shape of a curve which is drawn by a center line of the groove G in a groove width direction (hereinafter, also referred to simply as "center line of the groove G") will be described. In the following description, the curve drawn by the center line of the groove G will also be referred to simply as "curve" for convenience of description. Typically, as illustrated in FIG. 1, the total width of the steel sheet 1 which reaches about 1 m is covered with multiple curve groups Gs1, Gs2, and Gs3, (the rest is omitted) each of which is a group of multiple grooves G. Typically, since it is difficult for one laser scanner to form the grooves over the total width, multiple laser scanners LS1, LS2, and LS3 (the rest is omitted) are used for the groove forming process. As a result, the multiple curve groups Gs1, Gs2, and Gs3, (the rest is omitted) are formed on the steel sheet 1. However, the present invention is not limited to this configuration, and one laser scanner may form one curve group over the total width. The structure of the laser scanner will be described below in detail. In addition, hereinafter, when it is not necessary to specify any one of the curve groups Gs1, Gs2, and Gs3, (the rest is omitted), the curve groups Gs1, Gs2, and Gs3, (the rest is omitted) will be collectively referred to as "curve groups Gs".

Figure 2:
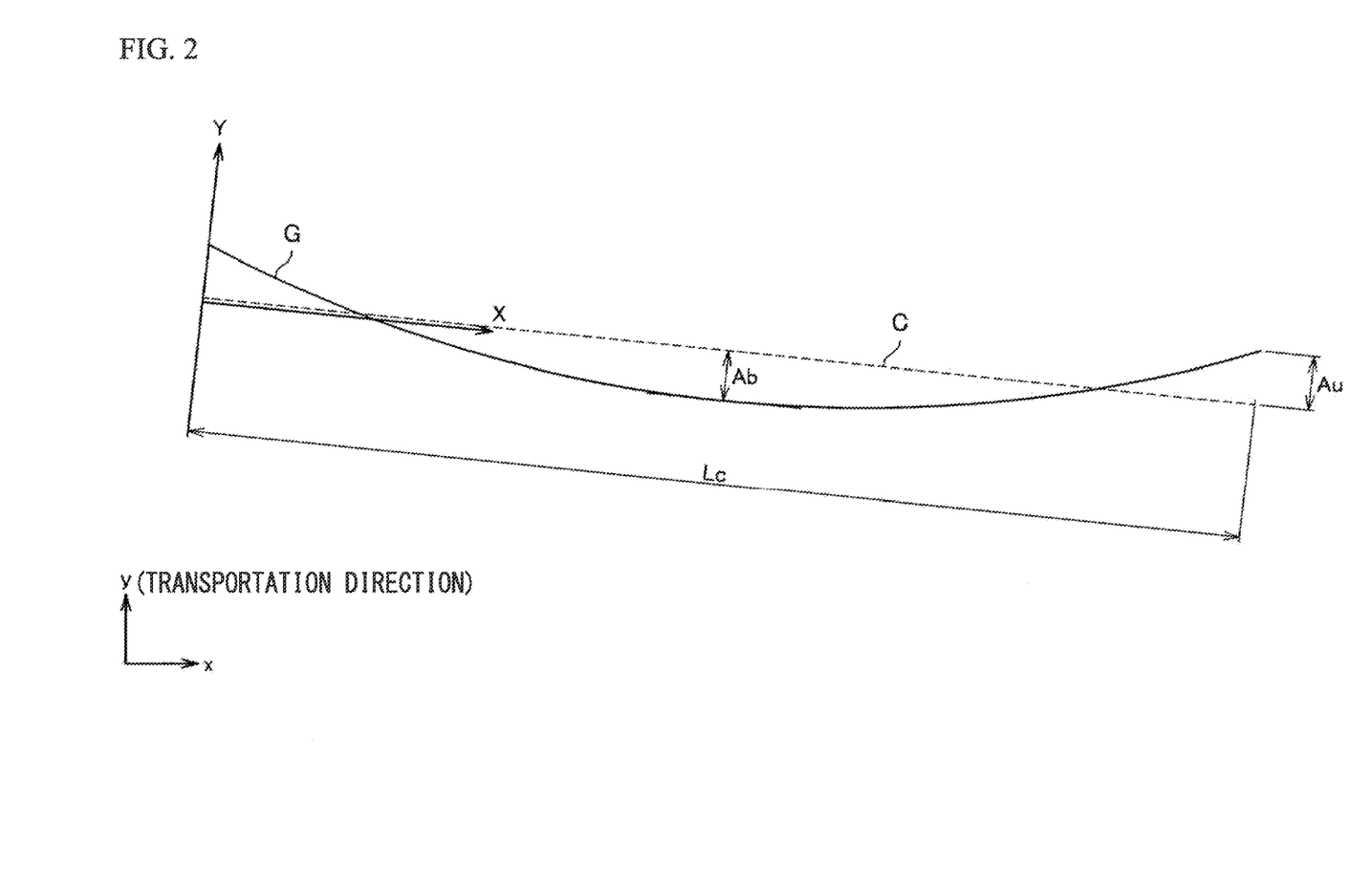
FIG. 2 is a schematic diagram illustrating the details of the shape of a groove (curve) which is formed in the grain-oriented magnetic steel sheet according to the embodiment.

Each of the curve groups Gs includes multiple curves G (grooves G) which are formed at predetermined pitches PL. FIG. 2 illustrates only one curve G for convenience of description. In the grain-oriented magnetic steel sheet according to the embodiment, a relationship between a standard deviation value D with respect to a linear approximation line C of each of the curves G; and the pitch PL satisfies the following expression (1). In the grain-oriented magnetic steel sheet according to the embodiment, this expression (1) is satisfied for all the curves G included in each of the curve groups Gs.

[Expression 3]

$$0.02 \leq (D/PL) \quad (1)$$

The standard deviation value D is obtained as follows. First, in a coordinate system in which an x axis represents the direction perpendicular to the transportation direction of the steel sheet 1 and a y axis represents the transportation direction, the curve G is expressed by a function of y=f(x). The linear approximation line C with respect to the curve G which is expressed by y=ax+b is obtained using a well-known least-squares method. Next, in a new coordinate system in which an X axis represents a direction of the linear approximation line C and a Y axis represents a direction perpendicular to the X axis, the curve G is expressed by Y=g(X). The X and Y axes may be parallel to the x and y axes but, depending on the shape of the curve G, may also be inclined to the x and y axes as illustrated in FIG. 2. The standard deviation value D is defined by the following expression (2).

[Expression 4]

$$D = \sqrt{\frac{1}{L_c} \int_0^{L_c} dX |Y|^2} \quad (2)$$

(wherein Lc represents the length of the curve G in the X axis direction)

In addition, in the embodiment, as illustrated in FIG. 2, an amplitude A of the curve G is defined as the sum of a distance Au and a distance Ab (A=Au+Ab), the distance Au ranging from the linear approximation line C of the curve G to a point most distant from the linear approximation line C in a up direction (positive direction of the Y axis), the distance Ab ranging from the linear approximation line C to a point most distant from the linear approximation line C in a down direction (negative direction of the Y axis).

Figure 4A:
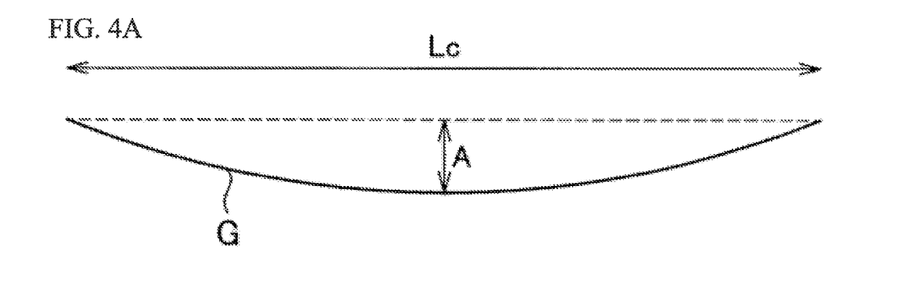
FIG. 4A is a schematic diagram illustrating a first example of the groove shape in the grain-oriented magnetic steel sheet according to the embodiment.
Figure 4B:
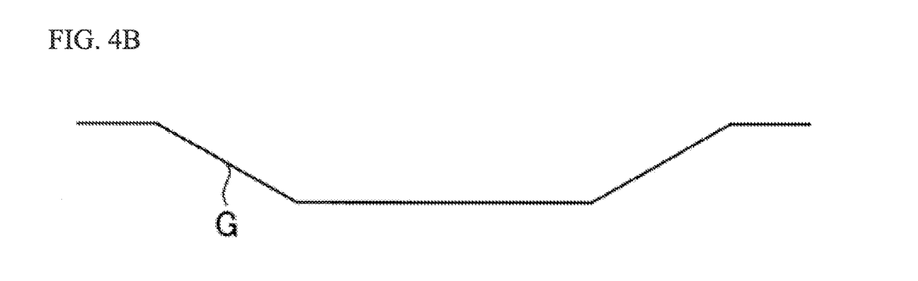
FIG. 4B is a schematic diagram illustrating a second example of the groove shape in the grain-oriented magnetic steel sheet according to the embodiment.

Next, the reason for setting (D/PL) to 0.02 or more as in the expression (1) will be described. In a method of the related art in which the center line of the groove G is linear (D/PL=0), a center position of the groove G, which is a deformation starting point, in a groove width direction is arranged to be linear on the linear approximation line C. On the other hand, the present inventors found that, when the deformation starting point is dispersed at positions of the linear approximation line C by allowing the center line of the groove G to be curved (specifically, positions of respective points on the curve G are dispersed in the Y axis direction when the curve G is seen from the X axis direction of FIG. 2), the total warpage amount of the steel sheet can be reduced. The standard deviation value D indicates the dispersion degree of the deformation starting point, and for warpage, a ratio of this standard deviation value D having a lengthwise dimension to the dimension of the groove pitch PL is important. As described below in Examples, it is clarified that, when (D/PL) is 0.02 or more, a space factor can increase. In the embodiment, the shape of the groove G is not particularly limited as long as it is not linear and various shapes including an arc shape of FIG. 4A and a sectionally linear shape of FIG. 4B in which multiple straight lines are connected to each other, not one continuously smooth curve shape, can be considered. However, in either case, the above-described warpage mechanism is invariable, and the same effects can be obtained by setting (D/PL) to be 0.02 or more.

The upper limit of (D/PL) for obtaining an effect of reducing the warpage amount of the steel sheet 1 is not particularly present. However, when the upper limit of (D/PL) is excessively high, the amplitude A of the curve G increases, and an angle formed between the curve G and the direction perpendicular to the transportation direction increases. In a magnetic domain refinement technique of the related art in which one linear groove G is formed, it is known that, when the angle formed between the direction of the groove G and the direction perpendicular to the transportation direction is more than ±30°, an effect of reducing the iron loss decreases. Likewise, in the case of the curved groove G according to the embodiment, when an average value of the angle formed between the direction of the groove G and the direction perpendicular to the transportation direction is more than ±30°, it is difficult to reduce the iron loss. Therefore, it is preferable that the average value of the angle formed between the direction of the groove G and the direction perpendicular to the transportation direction be within ±30°. More specifically, it is preferable that, when an angle formed between tangent lines of the curve G defined at the respective points on the curve G and the direction perpendicular to the transportation direction is represented by θ)(°), θ satisfy the following expression (3).

[Expression 5]

$$0° < \frac{1}{L_c} \int_0^{L_c} dX |\theta| \leq 30° \quad (3)$$

Further, from the viewpoint of reducing the iron loss, it is more preferable that the groove G (curve G) be smooth; and that the angle formed with the tangent lines and the direction perpendicular to the transportation direction be within ±30° in all the points of the groove G (curve G).

In the above-description, the description has been made on the assumption that the groove G continuously extends. Such a groove G can be obtained by continuously scanning the steel sheet 1 with a laser beam using a continuous-wave laser as disclosed in Patent Document 5. On the other hand, according to another embodiment of the present invention, for example, as disclosed in Patent Document 4, there may be provided a magnetic steel sheet including a groove having a row of points or a broken line-shaped groove which is obtained using a laser oscillating at intermittent time intervals.

Figure 3:
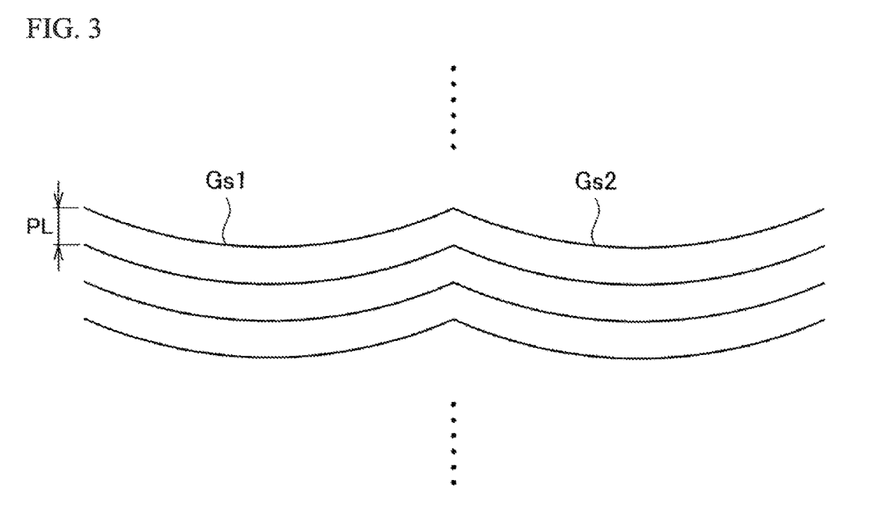
FIG. 3 is a schematic diagram illustrating an arrangement example of multiple curve groups (groove groups) which are formed in the grain-oriented magnetic steel sheet according to the embodiment.

In addition, in the embodiment, as illustrated in FIG. 3, curves groups Gs which looks as if they are connected to form one long curve G can be obtained by allowing an end of the curve of the curve group Gs1 and an end of the curve G of the curve group Gs2 to completely match with each other although multiple laser scanners are used. At this time, in a range where one long curve G is formed, when the standard deviation value D with respect to the linear approximation line C obtained with completely the same method as above is within the range of the expression (1), a grain-oriented magnetic steel sheet having the small warpage amount is obtained.

Figure 7:
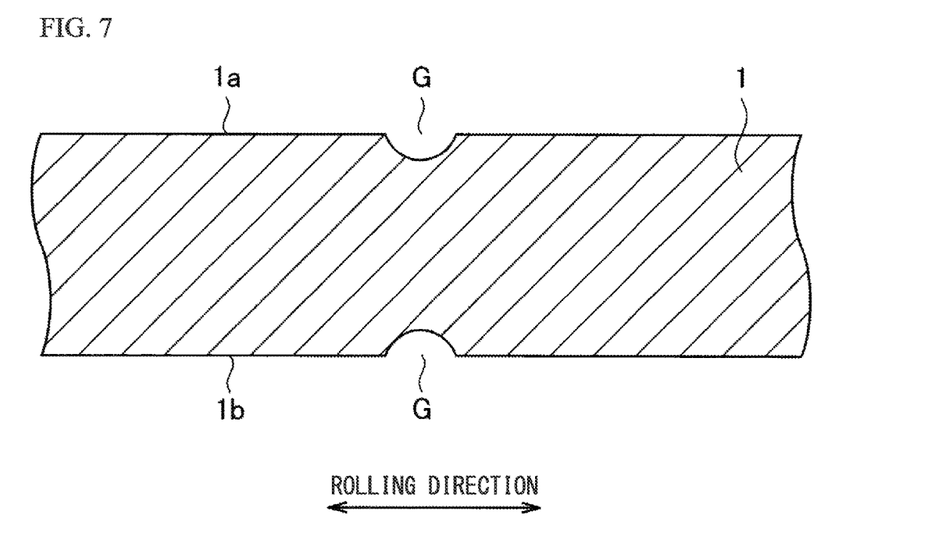
FIG. 7 is a schematic diagram illustrating the cross-sectional shape of a grain-oriented magnetic steel sheet according to another embodiment of the present invention.

Further, as illustrated in FIG. 7, the grooves G are formed on both front and back surfaces of the steel sheet 1. Accordingly, the warpage amount of the steel sheet 1 can be further reduced as compared to a case where the grooves G are formed on only a single surface. FIG. 7 is a schematic diagram illustrating a cross-sectional shape of the steel sheet 1 when the steel sheet 1 is seen from the transverse direction. In FIG. 7, the grooves G are formed on a front surface 1a and a back surface 1b of the steel sheet 1, and positions of grooves G (curves G) formed on the front surface 1a are the same as positions of grooves G (curves G) formed on the back surface 1b. Here, the meaning of the positions being the same includes not only a case where the positions of the grooves G of the front surface 1a are the same as the positions of the grooves G of the back surface 1b but a case where, even if the grooves G formed on both the front and back surfaces are shifted from each other in either the rolling direction or the transverse direction, the shift amount is less than or equal to the width of the grooves G. In this way, when the positions of the curves G (grooves G) formed on the front surface 1a and the back surface 1b of the steel sheet 1 are the same, the warpage amount of the steel sheet 1 can be further reduced as compared to a case where the positions of the curves G formed on the front surface 1a and the back surface 1b of the steel sheet 1 are not the same.

Next, an embodiment of a method of producing the grain-oriented magnetic steel sheet according to the embodiment will be described in detail using the drawings. First, typically, the grain-oriented magnetic steel sheet according to the embodiment is produced, for example, by using silicon steel slab as a material and performing a periodic groove forming process using laser irradiation in addition to a general production process of a grain-oriented magnetic steel sheet, the general production process including a hot rolling process, an annealing process, a cold rolling process, a decarburization annealing process, a final annealing process, a flattening annealing process, and an insulating film forming process which are performed in this order. The groove forming process using laser irradiation is performed before the insulating film forming process and after the cold rolling process or is performed after the insulating film forming process. When the groove forming process is performed after the insulating film forming process, a portion where an insulating film is peeled off is generated in a peripheral portion of a laser-irradiated portion, and thus it is preferable that the insulating film forming process be performed again. In the embodiment, a case where the groove forming process using laser irradiation is performed before the insulating film forming process and after the flattening annealing process is described as an example, but the same irradiation method as below can be used in another production process.

Hereinafter, a method of forming a groove using laser irradiation will be described in detail using a schematic diagram illustrating an example of a production apparatus including laser light sources and laser scanners which are used in the embodiment. FIG. 1 illustrates laser light sources and laser scanners. The steel sheet 1 is transported in a rolling direction (transportation direction) at a constant predetermined line speed VL. As illustrated in the drawing, light beams output from multiple laser light sources LO1, LO2, and LO3 (the rest is omitted) are conducted to multiple laser scanners LS1, LS2, and LS3 (the rest is omitted) through optical fibers 3 (refer to FIGS. 5A to 5C). By these laser scanners LS1, LS2, and LS3 (the rest is omitted) irradiating the steel sheet 1 with laser beams LB1, LB2, and LB3 (the rest is omitted), curve groups Gs1, Gs2, and Gs3, (the rest is omitted) are formed on the steel sheet 1.

Hereinafter, when it is not necessary to distinguish the laser light sources LO1, LO2, and LO3 (the rest is omitted) from each other, the laser light sources LO1, LO2, and LO3 (the rest is omitted) will be collectively referred to as "the laser light source LO". In addition, when it is not necessary to distinguish the laser scanners LS 1, LS2, and LS3 (the rest is omitted) from each other, the laser scanners LS1, LS2, and LS3 (the rest is omitted) will be collectively referred to as "the laser light scanner LS". In addition, when it is not necessary to distinguish the laser beams LB1, LB2, and LB3 (the rest is omitted) from each other, the laser beams LB1, LB2, and LB3 (the rest is omitted) will be collectively referred to as "the laser beam LB".

As the laser light LO, a laser light source having a high light-focusing property at a wavelength of 0.4 µm to 2.1 µm, that is, a laser light source such as a fiber laser or a thin disk type YAG laser is preferably used. When the laser beam LB output from such a laser light source LO is used, an effect of a plasma decreases, and the occurrence of a projection can be suppressed.

Figure 5A:
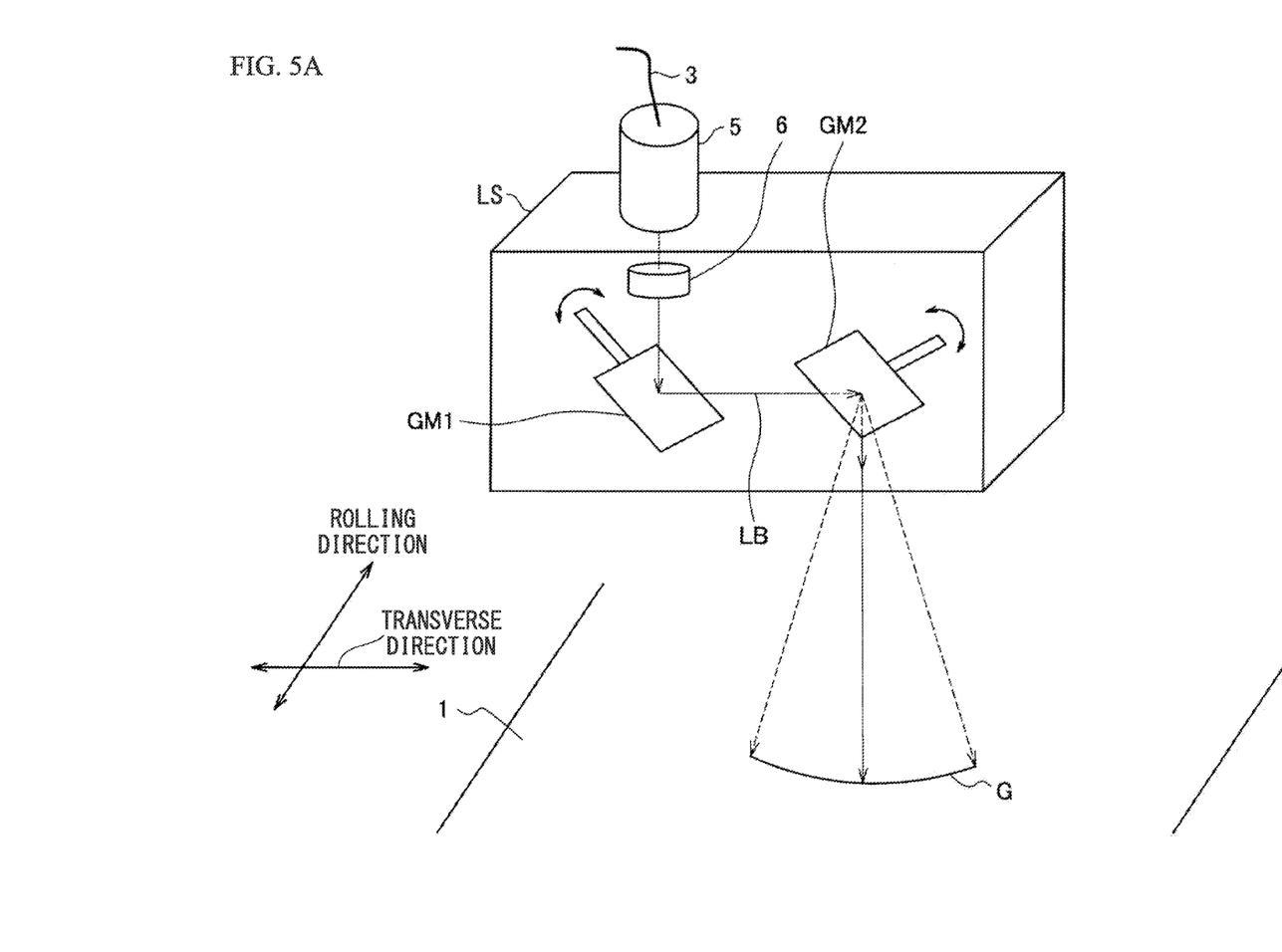
FIG. 5A is a schematic diagram illustrating a first configuration example of a laser scanner used for laser beam machining.

FIG. 5A is a diagram illustrating a configuration example of the laser scanner LS. As this laser scanner LS, for example, a well-known galvano scanner may be used. This laser scanner LS includes, as illustrated in FIG. 5A, a condensing lens 6 for focusing the laser beam LB which is output from a collimator 5 connected to the laser light source LO through the optical fiber 3; and two galvano mirrors GM1 and GM2 that reflects the laser beam LB.

By adjusting angles of the two galvano mirrors GM1 and GM2, the steel sheet 1 can be scanned at a high speed with the laser beam LB focused by the condensing lens 6. In the configuration example of the laser scanner LS illustrated in FIG. 5A, the scanning of the laser beam LB mainly in a direction (transverse direction) perpendicular to the rolling direction can be performed by the rotation of the galvano mirror GM2. In addition, the rotation of the galvano mirror GM1 has a function of making an interval (amplitude) from the linear approximation line by the scanning of the laser beam LB mainly in a direction (that is, rolling direction) perpendicular to the transverse direction. The condensing lens 6 can operate while moving back and forth in an optical axis direction of the laser beam LB to correct a change in work distance depending on the combination of deflection angles of the two galvano mirrors GM1 and GM2. Of course, the configuration of the laser scanner LS is not limited to the configuration illustrated in FIG. 5A, and any configuration can be adopted as long as the curves G (grooves G) can be two-dimensionally drawn in the steel sheet 1.

Figure 5B:
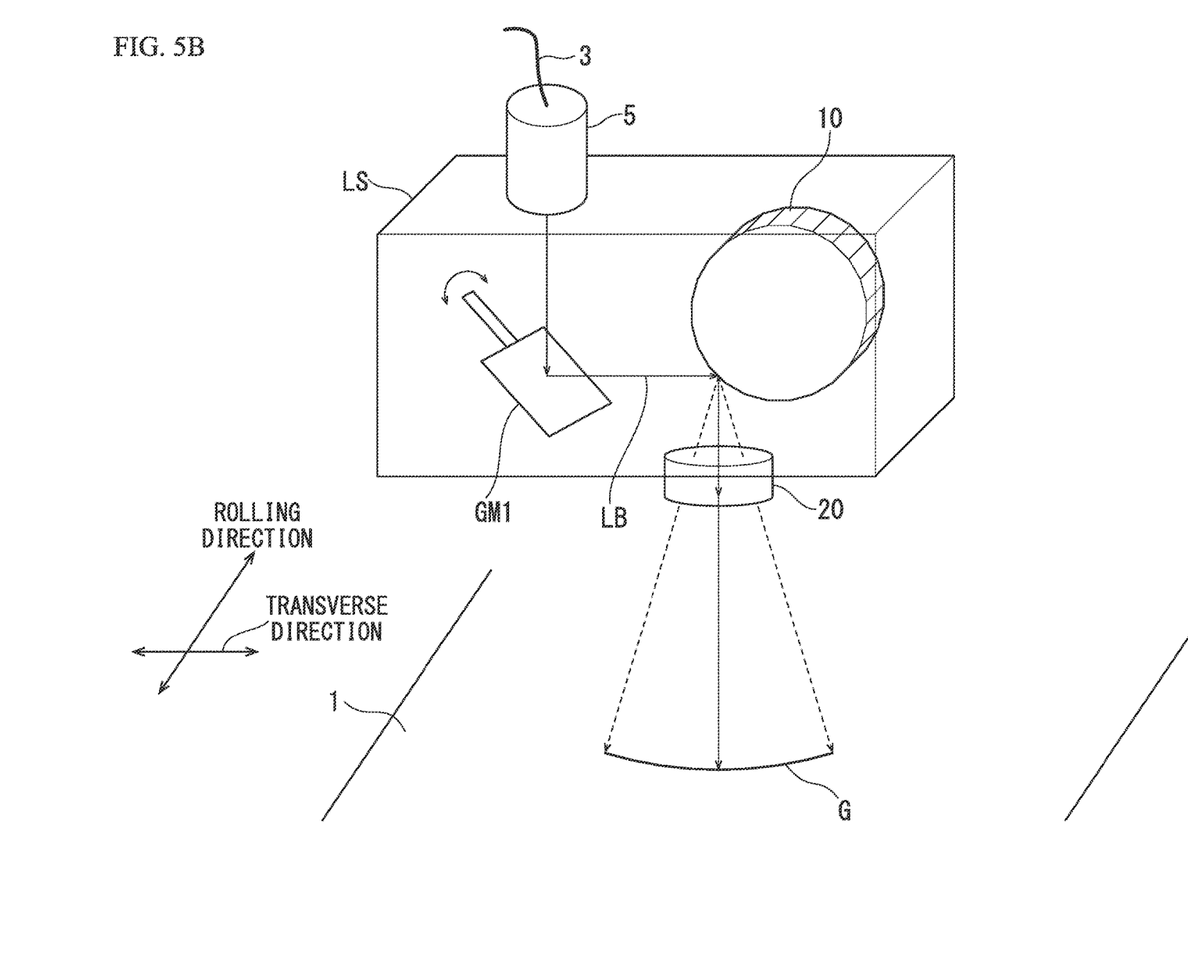
FIG. 5B is a schematic diagram illustrating a second configuration example of a laser scanner used for laser beam machining.

For example, as illustrated in FIG. 5B, a configuration in which one galvano mirror is combined with a polygon mirror as disclosed in Patent Document 5 may also be considered.

In the configuration example of the laser scanner LS illustrated in FIG. 5B, the scanning of the laser beam LB mainly in the transverse direction can be performed by the rotation of the polygon mirror 10. In addition, the rotation of the galvano mirror GM1 has a function of making an interval (amplitude) from the linear approximation line by the scanning of the laser beam LB mainly in the rolling direction. The fθ lens 20 is used as the condensing lens. Even if the laser beam LB is obliquely incident on the fθ lens 20 along with the scanning of the laser beam LB, the focal point of the laser beam LB on the steel sheet 1 can be maintained.

Figure 5C:
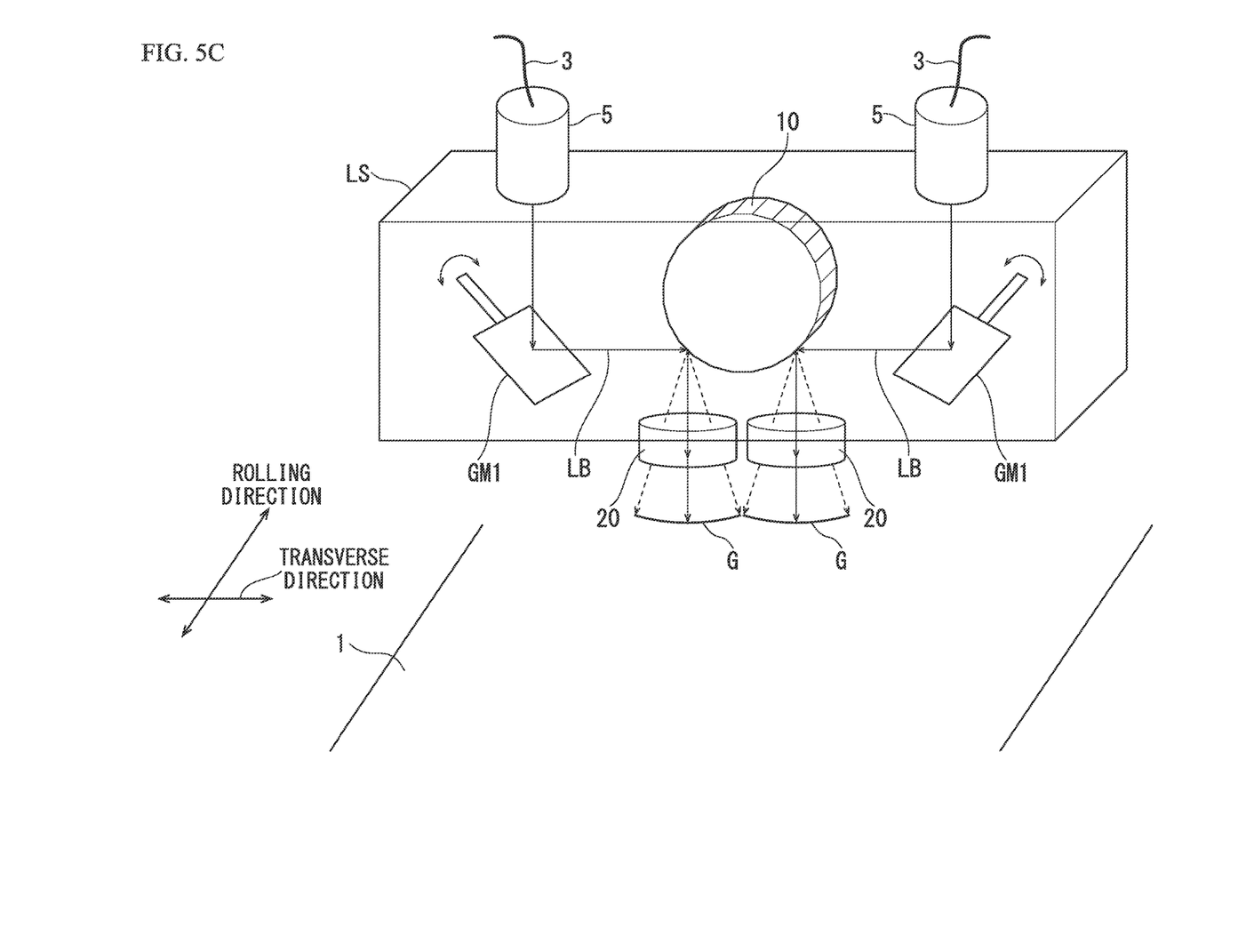
FIG. 5C is a schematic diagram illustrating a third configuration example of a laser scanner used for laser beam machining.

In addition, for example, as illustrated in FIG. 5C, in a configuration where the polygon mirror 10 shared by two laser beams LB is used, when it is necessary that multiple laser scanners LS be used to form the grooves G on the entire portion of the steel sheet 1 in the transverse direction, the number of laser scanners LS can be reduced. Therefore, the full size of a production apparatus can be reduced.

The width and depth of the groove G are determined depending on parameters such as the power, the scanning speed, and the focused shape of the laser beam LB. These parameters are adjusted such that the groove depth is 5 μm to 50 μm and the groove width is 10 μm to 300 μm. In order to irradiate the laser beams at predetermined pitches PL, the time required for one scanning, that is, the time T is set as expressed in the following expression (4) (during the time T, laser irradiation starts from a starting end of a scan width, laser scanning is performed to a finishing end of the scan width, and the next laser irradiation starts from the next starting end).

$$PL = T \times VL \quad (4)$$

Figure 4C:
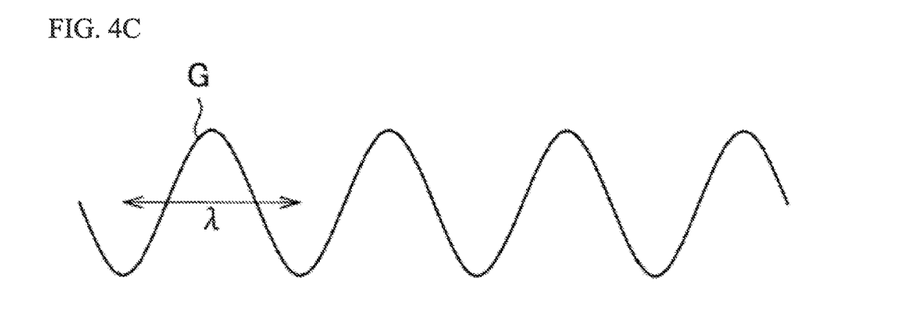
FIG. 4C is a schematic diagram illustrating a third example of the groove shape in the grain-oriented magnetic steel sheet according to the embodiment.
Figure 4D:
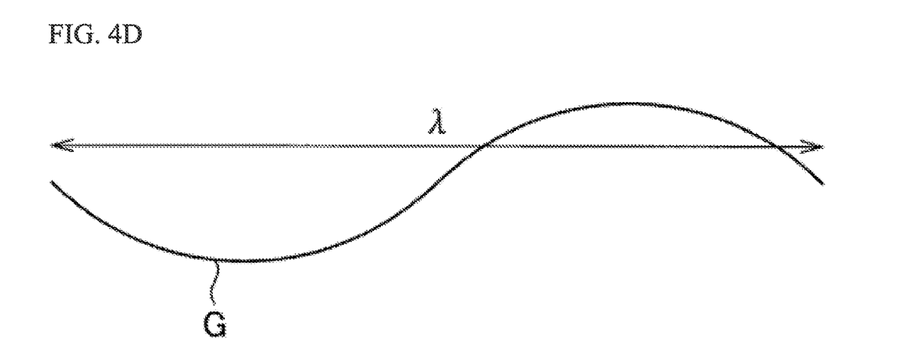
FIG. 4D is a schematic diagram illustrating a fourth example of the groove shape in the grain-oriented magnetic steel sheet according to the embodiment.

FIGS. 4C and 4D illustrate examples of the shape of one curve G (groove G) obtained by the scanning of the laser beam LB output from one laser scanner LS in the embodiment. The values of (D/PL) calculated from these curves G are the same. However, when the wavelength λ, of one period of the curve G is excessively short as illustrated in FIG. 4C, high-speed scanning in the transportation direction is required, and the scanner may be limited by the allowable maximum scanning speed. On the other hand, in FIG. 4D, the wavelength λ, of the curve G is longer than that of FIG. 4C, the scanner is not likely to be limited by the scanning speed. For example, in an embodiment in which a sine wave-shaped curve G is formed as illustrated in FIGS. 4C and 4D, it is preferable from the viewpoint of industrial production that the wavelength λ of the curve G be 10 mm or longer.

EXAMPLES

Next, a confirmatory experiment for confirming the effects of the embodiment will be described. First, a slab having a composition containing Si: 3.0 mass %, C, 0.05 mass %, Mn: 0.1 mass %, acid-soluble Al: 0.02 mass %, N: 0.01 mass %, S: 0.01 mass %, P: 0.02 mass %, and a balance including Fe and unavoidable impurities was prepared. This slab was subjected to hot rolling at 1280° C., and a hot-rolled material having a thickness of 2.3 mm was produced. Next, the hot-rolled material was heated under a condition of 1000° C.×1 min. After the heat treatment, a pickling treatment was performed, and then cold rolling was performed. As a result, a cold-rolled material having a thickness of 0.23 mm was produced. This cold-rolled material was subjected to decarburization annealing under a condition of 800° C.×2 min, and then an annealing separator containing magnesia as a major component was applied thereto. In a state of being coiled into a coil shape, the cold-rolled material to which the annealing separator was applied was charged into a batch furnace, followed by final annealing under a condition of 1200° C.×20 hr. Next, flattening annealing was performed, and then groove forming was performed by laser irradiation using a method described below. Finally, an insulating film was formed on the material.

As a production apparatus including the laser scanner LS and the like, those illustrated in FIGS. 1 and 5A were used. An example where a fiber laser doped with Yb as a laser medium is used as the laser light source LO will be described. In FIG. 1, the steel sheet 1 is a grain-oriented magnetic steel sheet which is manufactured through the above-described process, in which the width of the steel sheet after final annealing is 1000 mm, and a glass film is formed on a surface of a matrix. The steel sheet 1 is transported in the rolling direction (transportation direction) at a constant line speed VL.

The laser beam intensity P was 1000 W, the focused beam diameter d was 0.04 mm, and the pitch PL was 5 mm. Each instantaneous speed has a direction following a tangent line of the curve G, but the magnitude of the speed projected on the linear approximation line was within a range of 8000±450 mm/s. Under these laser beam irradiation conditions, the substantially arc-shaped groove G of FIG. 4A was formed. The length Lc (refer to FIG. 2) of the groove determined depending on the scan width of one scanner was 100 mm. In the experiment, by changing the amplitude A as a parameter, grain-oriented magnetic steel sheets having different curve-shaped grooves G were manufactured. Irrespective of the amplitude A, the groove width was in a range of 55±5 μm, and the groove depth was in a range of 15±3 μm.

In addition, as a comparative example, grooves were formed on the same steel plate materials using the method in which a tooth-shaped die is mechanically pressed. At this time, the shape of the groove was linear, the pitch PL was 5 mm. The groove width was 52 μm, the groove depth was 14 μm, and the groove substantially having the same cross-sectional shape as that of the laser method was formed.

In order to evaluate the effect of the warpage amount formed by the irradiation of the laser beam LB, a space factor was measured according to JIS 2550. As described above, an increase in space factor represents a reduction in the warpage amount of the steel sheet 1.

Figure 6:
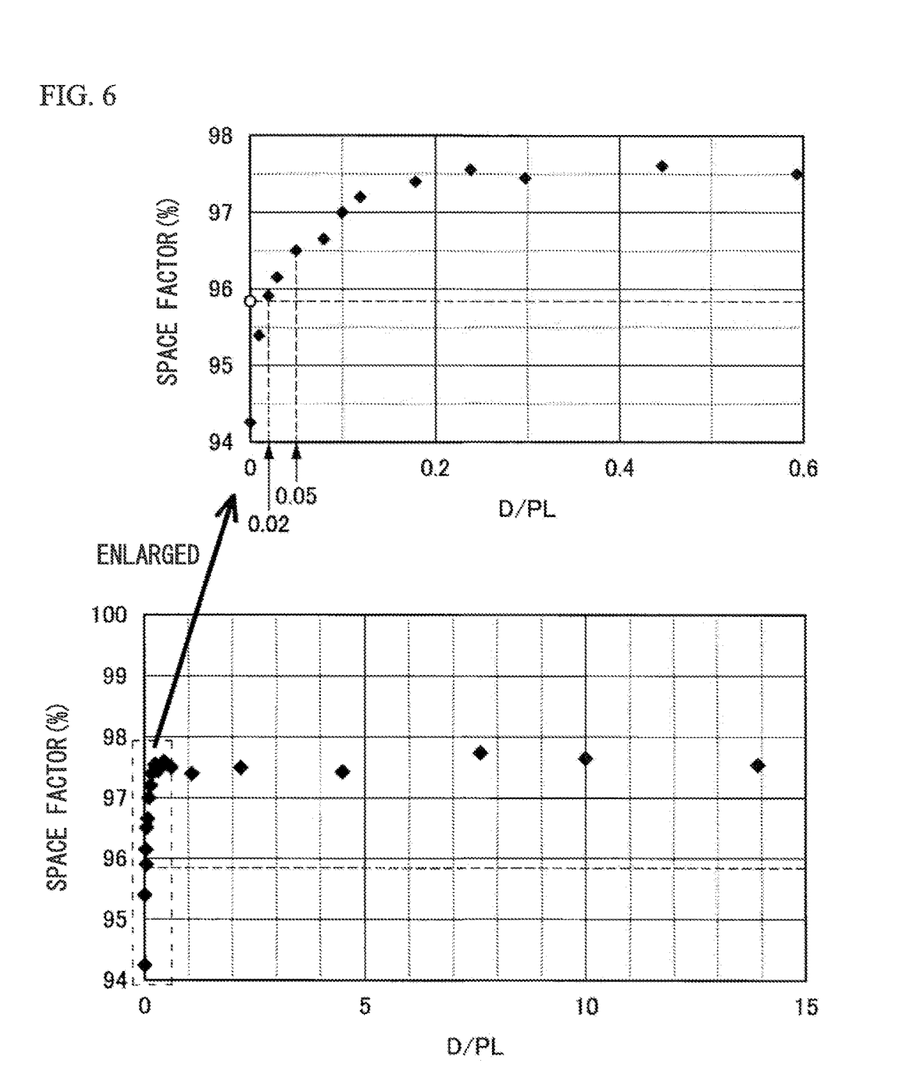
FIG. 6 is a diagram illustrating a relationship between a standard deviation value with respect to a linear approximation line of a center line of a groove; and a space factor.

FIG. 6 illustrates the measurement results of the space factor. In a graph of FIG. 6, the horizontal axis represents (D/PL) obtained using the above-described method, and the vertical axis represents the space factor. In FIG. 6, the space factor of the linear groove (D/PL=0) which was mechanically formed in the comparative example is indicated by a white circle. It can be seen from FIG. 6 that, when (D/PL) is less than 0.02, the space factor of the groove G obtained using the laser method is lower than that of the mechanically formed linear groove; however, when (D/PL) is 0.02 or higher, the space factor of the groove G obtained using the laser method is higher than that of the mechanically formed linear groove. In particular, when (D/PL) is 0.05 or higher, the space factor shows a high value of 96.5% or higher. Further, when (D/PL) is 0.1 or higher, the space factor shows a high value of 97% or higher.

It can be seen from the above results that, when a relationship between the standard deviation value D and the groove pitch PL satisfies the above-described expression (1), the warpage amount of the steel sheet 1 can be reduced. By reducing the warpage amount, when the steel sheet is laminated and compressed as an iron core material of a winding transformer, the space factor is high, the performance as a transformer is high, and the effect of stress concentration is released. Therefore, excellent iron loss characteristics can be realized.

Hereinbefore, the preferred embodiments of the present invention have been described. However, the present invention is not limited to these preferred embodiments. Various additions, omissions, substitutions, and other modifications can be made for the configuration within a range not departing from the scope of the present invention. The present invention is not limited to the above description but is only limited to the accompanying claims.

INDUSTRIAL APPLICABILITY

According to the present invention, when grooves are formed by laser beam irradiation on a surface of a steel sheet, the deformation amount of the steel sheet caused by the formation of the grooves can be reduced. Accordingly, a magnetic steel sheet having the following advantageous effects can be provided. When the steel sheet is laminated and compressed as an iron core material of a winding transformer, the space factor is high, the performance as a transformer is high, and the effect of stress concentration is released. Therefore, excellent iron loss characteristics can be realized.

BRIEF DESCRIPTION OF THE REFERENCE SYMBOLS

1: GRAIN-ORIENTED MAGNETIC STEEL SHEET (STEEL SHEET)
3: OPTICAL FIBER
5: COLLIMATOR
6: CONDENSING LENS
10: POLYGON MIRROR
20: fθ LENS
LB: LASER BEAM
PL: GROOVE PITCH
LO: LASER LIGHT SOURCE
LS: LASER SCANNER
G: GROOVE (CURVE)
Gs: CURVE GROUP

The invention claimed is:

1. A grain-oriented magnetic steel sheet comprising grooves each of which extends in a direction intersecting a transportation direction, the grooves being formed at predetermined pitches PL in the transportation direction by laser beam irradiation,
wherein a melt-resolidified portion is formed in the grooves,
wherein each of the grooves is formed to be curved in a length $L_c$ when viewed from a direction perpendicular to a surface of the grain-oriented magnetic steel sheet,
wherein multiple grooves are formed in the direction intersecting the transportation direction, and
wherein
  a relationship between a standard deviation value D which is defined by the following expression (2) and the pitch PL satisfies the following expression (1), the standard deviation value D being a standard deviation of distances between a linear approximation line, which is obtained from a center line of each of the grooves in a groove width direction by a least-squares method, and respective positions on the center line, and
  an average angle formed between tangent lines of the respective positions on the center line and a direction perpendicular to the transportation direction is more than 0° to 30°

$$0.02 \le (D/PL) \quad (1)$$

$$D = \sqrt{\frac{1}{L_C} \int_0^{L_C} dX |Y|^2} \quad (2)$$

wherein X is an axis which represents a direction of a linear approximation line C and Y is an axis which represents a direction perpendicular to the linear approximation line C, and
when a curve of each of the grooves is expressed by a function of y=f(x) in a coordination system in which an x axis represents a direction perpendicular to the transportation direction of the grain-oriented magnetic steel sheet and a y axis represents the transportation direction, the linear approximation line C with respect to the curve of each of the grooves which is expressed by y=ax+b is obtained using a least-squares method.

2. The grain-oriented magnetic steel sheet according to claim 1,
wherein the grooves are formed on a front surface and a back surface of the grain-oriented magnetic steel sheet.

3. The grain-oriented magnetic steel sheet according to claim 2,
wherein positions of the grooves formed on the front surface are the same as positions of the grooves formed on the back surface.

4. A method of producing a grain-oriented magnetic steel sheet, the method comprising:
irradiating a grain-oriented magnetic steel sheet with a laser beam to form grooves, each of which extends in a direction intersecting a transportation direction, at predetermined pitches PL in the transportation direction,
wherein a melt-resolidified portion is formed in the grooves,
wherein each of the grooves is formed to be curved in a length $L_c$ when viewed from a direction perpendicular to a surface of the grain-oriented magnetic steel sheet,
wherein multiple grooves are formed in the direction intersecting the transportation direction, and
wherein
  a relationship between a standard deviation value D which is defined by the following expression (2) and the pitch PL satisfies the following expression (1), the standard deviation value D being a standard deviation of distances between a linear approximation line, which is obtained from a center line of each of the grooves in a groove width direction by a least-squares method, and respective positions on the center line, and
  an average angle formed between tangent lines of the respective positions on the center line and a direction perpendicular to the transportation direction is more than 0° to 30°

$$0.02 \le (D/PL) \quad (1)$$

$$D = \sqrt{\frac{1}{L_C} \int_0^{L_C} dX |Y|^2} \quad (2)$$

wherein X is an axis which represents a direction of a linear approximation line C and Y is an axis which represents a direction perpendicular to the linear approximation line C, and
when a curve of each of the grooves is expressed by a function of y=f(x) in a coordination system in which an x axis represents a direction perpendicular to the transportation direction of the grain-oriented magnetic steel sheet and a y axis represents the transportation direction, the linear approximation line C with respect to the curve of each of the grooves which is expressed by y=ax+b is obtained using a least-squares method.

5. The method of producing a grain-oriented magnetic steel sheet according to claim 4, wherein a wavelength of the laser beam is in a range of 0.4 μm to 2.1 μm.

* * * * *